United States Patent
Wollmann et al.

(10) Patent No.: US 6,911,164 B2
(45) Date of Patent: Jun. 28, 2005

(54) SPHERICAL STEROL PREPARATIONS, THEIR PRODUCTION AND THEIR USE

(75) Inventors: Gerhard Wollmann, Hilden (DE); Bernhard Gutsche, Hilden (DE); Wolfgang Albiez, Neuss (DE); Jean Rigal, Tournefeuille (FR); Yannik Basso, Muret (FR)

(73) Assignee: Cognis Deutschland GmbH & Co. KG, Duesseldorf (DE)

( * ) Notice: Subject to any disclaimer, the term of this patent is extended or adjusted under 35 U.S.C. 154(b) by 336 days.

(21) Appl. No.: 10/259,684

(22) Filed: Sep. 27, 2002

(65) Prior Publication Data

US 2003/0057579 A1 Mar. 27, 2003

Related U.S. Application Data

(60) Provisional application No. 60/325,348, filed on Sep. 27, 2001.

(51) Int. Cl.$^7$ .................................................. B29B 9/10
(52) U.S. Cl. ............................... 264/9; 264/12; 264/13
(58) Field of Search ................................ 264/9, 13, 12

(56) References Cited

U.S. PATENT DOCUMENTS 5,622,656 A * 4/1997 Huc et al. ..................... 264/4.7
5,643,604 A     7/1997 Angeles Uribe et al.
5,766,521 A     6/1998 Le Thiesse et al.
6,231,841 B1    5/2001 Franklin et al.

FOREIGN PATENT DOCUMENTS

| DE | WO 01 00046 | 1/2001 |
| EP | 0 737 509 | 10/1996 |
| GB | 931 147 | 7/1963 |

OTHER PUBLICATIONS

Hornberg et al., "Einfluss von Minorbestandtellen des Unverselfbaren auf die Sterlnanalyse", Fat. Sci. Technol. 91, Jahrgang Nr. 3 1989, pp. 105–108.

"The Merck Index —11. Auflage" 1989, Merck & Co., Inc., XP002228867, pp. 1089, 1353–1354.

* cited by examiner

Primary Examiner—Stephen J. Lechert, Jr.
(74) Attorney, Agent, or Firm—Arthur G. Seifert

(57) ABSTRACT

A process for making spherically-shaped sterol preparations involving: (a) providing a liquid sterol preparation; (b) forming the liquid sterol preparation into liquid sterol droplets; and (c) solidifying the liquid sterol droplets to form the spherically-shaped sterol preparations.

22 Claims, No Drawings

SPHERICAL STEROL PREPARATIONS, THEIR PRODUCTION AND THEIR USE

CROSS-REFERENCE TO RELATED APPLICATIONS

This application claims the benefit of now abandoned provisional application Ser. No. 60/325,348 filed on Sep. 27, 2001.

BACKGROUND OF THE INVENTION

This invention relates to droplet-like sterol preparations with a narrow particle size distribution, to a process for their production, and to their use in food preparations.

In known processes for the production of solid sterol preparations, the water-containing sterol crystals are first melted at temperatures above 135° C. in a stirred tank reactor and then dried. The resulting preparation is then converted into flake form on a cooled roller. The flakes obtained by this process have a high dust content and are tacky and nonuniform. These disadvantages result in poor flow behavior and hence processing. In addition, the flakes can only be dissolved in formulations and solvents by intensive dispersion. Accordingly, there was a need for other supply forms.

EP 737 509 B1 describes a process for the production of crystallized beads in which the melted product is dispersed to form droplets and the droplets thus formed are cooled at a temperature below the glass transition temperature of the product so that they harden by vitrification. The beads thus vitrified are kept at a temperature below the glass transition temperature and combined with crystallization nuclei, after which the beads can be crystallized by increasing the temperature beyond the glass transition temperature and are then collected. Critical parameters in this process are in particular the fact that it operates with a supercooled melt and uses crystallization nuclei.

Accordingly, the problem addressed by the present invention was to provide new sterol spheres which would be free from the described disadvantages, i.e. would have a narrow particle size distribution, a reduced dust content, reduced tackiness, an improved dissolving rate both in aqueous and in oily media and hence improved incorporation in surface-active preparations, such as preferably cosmetic and/or pharmaceutical preparations and foods. Another problem addressed by the invention was to enable these spherical sterols or sterol beads to be produced without the use of crystallization nuclei.

SUMMARY OF THE INVENTION

The present invention relates to droplet-like sterol preparations with a narrow particle size distribution which are obtained by converting a preparation solid at room temperature and containing one or more sterols into droplets as a melt with a temperature from about 5 to about 40° C. above the melting point of the preparation using a drop forming system and exposing the droplets to a cooling medium flowing in countercurrent to them or contacting the droplets with a cooling medium which solidifies and cools them.

The present invention also relates to a process for the production of droplet-like sterol preparations with a narrow particle size distribution in which a preparation solid at room temperature and containing one or more sterols is converted into droplets as a melt with a temperature from about 5 to about 40° C. above the melting point of the preparation using a droplet forming system and the droplets are exposed to a cooling medium flowing in countercurrent to them or are contacted with a cooling medium which solidifies and cools them.

It has surprisingly been found that spherical or bead-like sterols can be obtained by forming droplets without the use of crystallization nuclei. To this end, the sterol preparations are introduced as a melt into the cooling and solidifying unit through a perforated disk or a die plate. The liquid is made to vibrate by vibration of the disk/plate so that the liquid strand is repeatedly interrupted and spherical or bead-like droplets are formed. By exposing the droplets to a cooling medium flowing in countercurrent or introducing them into a cooling medium, the heat of fusion is dissipated and the droplets solidify. A particular advantage is that—depending on the perforation diameter and the vibration frequency of the vibration generator—it is possible to adjust a particle spectrum with a narrow particle size distribution and a low dust content. In addition, a broad solidification range generally prevails during the production of the spheres or "beads". Another advantage over conventional supply forms, such as flakes for example, is that the surface of the droplets after solidification and cooling is no longer tacky, the particles can be packed in containers as free-flowing spheres or "beads" and, in addition, show significantly improved solubility both in oily and in aqueous media.

DETAILED DESCRIPTION OF THE INVENTION

For the production of the preparations according to the invention, the sterol preparations are introduced as a melt into the cooling and solidifying unit through a perforated disk or a die plate. The capacity of such perforated disks, which normally have from about 10 to about 750 perforations, is preferably in the range from about 0.3 to about 6 kg/h/perforation for a perforation diameter of from about 0.15 to about 1.2 mm. The droplets obtained have a diameter of from about 1.55 to about 2.0 times the diameter of the perforations.

The liquid is made to vibrate by vibration of the perforated disk so that the strand of liquid is repeatedly interrupted. Primary and secondary droplets are formed under the pressure conditions prevailing. The droplets form microspheres under the effect of the interfacial tension.

The vibration frequency is selected so that the secondary droplets normally formed as the droplets break off are drawn into the preceding or following primary droplets. In all processes, the frequency is typically in the range from about 100 to about 40,000 Hz and preferably in the range from about 200 to about 2,000 Hz. It can be generated by an activated membrane, a vibrating rod, a vibrating casting plate, by sonoexcitation, by sonication, by pulsation of the feed, by an activated secondary liquid coupled with the feed or by an activated gas layer.

In the solidifying unit, the melt droplets are first cooled to solidification temperature by cooling media and, after solidifying, are then cooled to the discharge temperature. The droplets are exposed to a gaseous or liquid, evaporating cooling medium flowing in countercurrent to them or are introduced into liquid cooling medium. Air, nitrogen or carbon dioxide is preferably used as the cooling medium. In one particular embodiment of the invention, the cooling medium may be circulated in the cooled state.

Another advantage over conventional processes for the production of solids from melts is that only a slight excess pressure (typically from about 100 to about 4,000 and more particularly from about 300 to about 2,000 mbar) need to be applied. The temperature at which the starting materials are introduced into the droplet forming tower is limited by the solidification range of the sterol preparations and, according to the invention, is in the range from about 110 to about 170° C., preferably in the range from about 110 to about 150° C. and more particularly in the range from about 130 to about 140° C. Feed temperatures of from about 5 to about 40° C. and preferably from about 10 to about 25° C. above the solidification point of the starting materials have proved to be particularly effective. At these temperatures, the viscosity of the melt is in such a range that the sterol preparations can already be readily converted into droplets and, at the same time, the formation of secondary droplets can be minimized by adapting the vibration frequency. According to the invention, therefore, the preparation is preferably converted into droplets at a viscosity below about 500 mPas and more particularly below about 100 mPas (Brookfield, spindle 1, 10 r.p.m.) and at a temperature of from about 5 to about 40° C. above the melting point.

The droplets or beads are substantially spherical and have a diameter in the range from about 0.23 to about 2.4 mm, depending on the perforation diameter of the perforated disk and the vibration frequency.

The sterols according to the invention can be produced by three different processes. Particulars of the process parameters described in the foregoing are explained in more detail in the following.

Process A: Droplet Formation by the "Droppo-Line" Method in a Long Dropping Tower Droplet formation in accordance with the invention by means of a casting plate and vibrating membrane is marketed under the name of "Droppo Line", for example by the firms Rieter-Automatik and Brace. Casting plates consisting of a heatable upper and lower plate are preferred for this particular process. The lower plate is generally in the form of a perforated disk through whose perforations or bores or capillary nozzles or droplet forming tubes the droplets then enter the drop forming tower.

The vibration frequency can be generated by an activated membrane, a vibrating rod, a vibrating plate or by sonoexcitation.

The droplets fall vertically downwards through the dropping tower in the substantial absence of turbulence. Although, basically, cooling can be carried out with a cold liquid (for example droplet formation in water) or a cold evaporating liquid (evaporation of liquid nitrogen or carbon dioxide), cooling in the dropping tower with a cold gas flowing in countercurrent—as adequately described in prior art—is recommended for practical reasons. The cooling gas is supplied as a cooled fresh gas or a cooled recirculated gas. Besides air, inert gases such as, for example, nitrogen or carbon dioxide may of course also be used as the cooling gas.

A particular feature of this process is that cooling to the solidification temperature, i.e. solidification and subsequent cooling to the discharge temperature, takes place in a long dropping tower with cold gas as a direct heat transfer medium.

The droplets formed by adapted vibration and then solidified are spherical and uniform with no voids and, depending on the perforation diameter of the perforated disk, the viscosity, the interfacial tension and the vibration frequency, have diameters of from about 1.55 to about 2.0 times the diameter of the perforations. The dust content, i.e. particles with particle size below about 0.3 mm, is at most about 1/1000 of the larger particles.

Process B: Droplet Formation by the "Jet Priller" Process in a Short Dropping Tower Two-stage process for the solidification and cooling of droplets.

In the first stage, the surface of the spheres is solidified by quenching with liquid, evaporating medium. In the second stage, residual solidification and further cooling take place in a final cooling unit.

Droplet formation can also be carried out using a casting plate and vibrating membrane of the type marketed, for example, by the firm GMF Gouda under the name of "Jet Priller".

The sterol melt is passed by a controlled excess pressure of from about 300 to about 2,000 mbar through one or more droplet forming systems which disperse the continuous product stream into droplets with a diameter of from about 1.6 to about 1.9 times the perforation diameter. The shape of the droplets is stabilized by cryogenic countercurrent cooling, i.e. by spraying in liquid evaporating nitrogen or carbon dioxide in a special prill solidifying tube (dropping height from about 1 to about 10 m, preferably from about 1 to about 2 m).

Dissipation of the residual heat of crystallization and final cooling and dissipation of the residual heat for complete crystallization take place in a rotating fluidized bed with cooled gas which is preferably circulated and which, preferably, is or may be the same gas as used for quenching. It is also cooled in the fluidized bed to the product discharge temperature.

Process C: Droplet Formation by the "Cryogen Rapid Pelletizer" Method of the Messer Company Single-stage process for the solidification and cooling of droplets by direct introduction of the liquid melt into a heat transfer medium, for example liquid nitrogen:

The melt is directly converted into droplets in liquid nitrogen. The beads formed roll down an inclined vibrating bed in liquid nitrogen, cool down, solidify and are further cooled. After separation of the beads from the liquid nitrogen on a sieve belt, the remaining liquid nitrogen is recycled into the process.

Sterols

Sterols in the context of the invention are steroids which only contain a hydroxyl group but no other functional groups at C-3. Formally, therefore, they are alcohols which is why this group of compounds is also referred to occasionally as sterols. In general, sterols contain from about 27 to about 30 carbon atoms and one double bond in the 5/6 position and occasionally in the 7/8, 8/9 or other positions. Besides these unsaturated species, suitable starting materials are the saturated compounds obtainable by hydrogenation.

Sterols which may be used for the purposes of the invention are those obtained from natural products such as, for example, soya, rapeseed, sunflower, coconut, palm kernel and palm oil. Preferred sterols are sigmasterol, campesterol, sitosterol, brassicasterols, stigmasterol, D5 avenasterol, D7 avenasterol, ergosterol, citrostadienol, cholesterol, lanosterols, spongosterols, fungisterols, stellasterols, zymosterols and mixtures thereof and, more particularly, phytosterols based on ergosterols, avenasterols (D5 and D7 avenasterol), campesterols, stigmasterols, sitosterols, brassicasterols, citrosdandiols, sigmastandiols and mixtures thereof. Any other phytosterols known to the expert may also be used. Their composition is described in "Sterinzusammensetzung und Steringehalt in 41 verschiedenen pflanzlichen und tierischen Fetten", E. Homberg; B. Bielefeld; Fat Sci. Technol, Vol. 91, No. 1, 1989.

Preparations of one or more sterols with an active substance content of from about 70 to about 99.9% by weight, preferably from about 75 to about 98% by weight and most preferably from about 80 to about 95% by weight are preferably used for the purposes of the present invention.

Commercial Applications

In one particular embodiment of the present invention, the sterol preparations may also be converted into droplet form together with one or more auxiliaries and additives solid at room temperature and then used in the form of mixtures—so-called compounds—in food preparations. Accordingly, the present invention also relates to the use of the sterol beads, optionally in admixture with other auxiliaries and additives, as a food additive.

EXAMPLES

Example 1

GENEROL® 95 ex rapeseed, a product of Cognis (84% by weight active substance, 0–1.5% by weight stigmasterol, 30–45% by weight campesterol, 40–60% by weight sitosterol, 8–18% by weight brassicasterol), melting temperature 138° C., was continuously converted into droplets in a Droppo Line (Rieter Automatik GmbH) with 500 $\mu$m bores at a throughput rate of 1.6 kg/h/bore. Starting from a droplet forming temperature of 165° C., a product temperature of 22° C. was established. Cooling was carried out with air at 12 to 16° C. over a dropping height of 23 m. Dust-free, free-flowing and non-tacky sterol beads with a uniform particle size distribution were obtained. The average particle size was 1.65 times the perforation diameter.

Example 2

GENEROL® 95 ex rapeseed, a product of Cognis (see Example 1), was continuously converted into droplets in a Droppo Line (Rieter Automatik GmbH) with 650 $\mu$m bores at a throughput rate of 3.3 kg/h/bore. Starting from a droplet forming temperature of 165° C., a product temperature of 24° C. was established. Cooling was carried out with air at 12 to 16° C. over a dropping height of 23 m. Dust-free, free-flowing and non-tacky sterol beads with a uniform particle size distribution (>95.1% at least 1,000 $\mu$m in size) were obtained. The average particle size was 1030 $\mu$m.

Example 3

GENEROL® 95 ex rapeseed, a product of Cognis (see Example 1), was continuously converted into droplets in a Droppo Line (Rieter Automatik GmbH) with 800 $\mu$m diameter bores at a throughput rate of 4.8 kg/h/bore. Starting from a droplet forming temperature of 165° C., a product temperature of 51° C. was established. Cooling was carried out with air at 12 to 16° C. over a dropping height of 23 m. Dustfree, free-flowing and non-tacky sterol beads with a uniform particle size distribution were obtained. The average particle size was 1520 $\mu$m. 88% of the particles were between 1250 $\mu$m and 1600 $\mu$m in size.

Example 4

GENEROL® 100 ex soya, a product of Cognis (95% by weight active substance content, 20% by weight stigmasterol, 24% by weight campesterol, 47% by weight sitosterol and 4% by weight brassicasterol; melting temperature 111–120° C.), was converted into droplets in a Droppo Line (Rieter Automatik GmbH) with 120 bores 500 $\mu$m in diameter at a throughput rate of 104 kg/h/plate. Starting from a droplet forming temperature of 153° C., a product temperature of 24° C. was established. Cooling was carried out with air at 5° C. over a dropping height of 11 m. Dust-free, free-flowing and non-tacky sterol beads with a uniform particle size distribution (99.7% 800 $\mu$m in size) were obtained. The average particle size was 1.62 times the bore diameter.

Example 5

GENEROL® 100 ex soya, a product of Cognis (see Example 4), was continuously converted into droplets in a Droppo Line (Rieter Automatik GmbH) with 120 bores 600 $\mu$m in diameter at a throughput rate of 283 kg/h/plate. Starting from a droplet forming temperature of 147° C., a product temperature of 48° C. was established. Cooling was carried out with air at 25° C. over a dropping height of 11 m. Dust-free, free-flowing and non-tacky sterol beads with a uniform particle size distribution were obtained. The average particle size was 1036 $\mu$m. 91% of the particles were between 800 $\mu$m and 1250 $\mu$m in size.

Example 6

GENEROL® 90 ex rapeseed, a product of Cognis (88% by weight active substance, 0–1.5% by weight stigmasterol, 30–45% by weight campesterol, 40–60% by weight sitosterol, 8–18% by weight brassicasterol; melting temperature 130–140° C.) was converted into droplets in a Jet Priller (GMF Gouda) with 200 bores 500 $\mu$m in diameter at a throughput rate of 360 kg/h/plate and at a droplet forming temperature of 152° C. The droplets were quenched with 160 kg/h liquid nitrogen flowing in countercurrent in a 2 m tall tower. The residual heat was dissipated in a circulating fluidized bed with recycle gas cooled by liquid nitrogen until the product had an exit temperature of 27° C. Residual heat heated the product to 34° C. in the container. 97% of the product was larger than 600 $\mu$m in size.

Dissolving Behavior of the Sterol Beads Compared with Sterol Flakes in Various Solvents Spherical Generol 100 beads (see Example 4) were dissolved in various solvents. The dissolving rate of the spherical beads was higher than that of conventional flakes

- by a factor of 2 in nonpolar dichloromethane with high sterol solubility at 20° C.,
- by a factor of 3 in refined sunflower oil with average sterol solubility at 50° C.,
- by a factor of 3 in refined rapeseed oil with average sterol solubility at 50° C.,
- by a factor of 5 in polar methanol with low sterol solubility at 50° C.

What is claimed is:

1. A process for making spherically-shaped sterol preparations comprising:
   (a) providing a liquid sterol preparation;
   (b) forming the liquid sterol preparation into liquid sterol droplets; and
   (c) solidifying the liquid sterol droplets to form the spherically-shaped sterol preparations.

2. The process of claim 1 wherein the liquid sterol droplets are formed by passing the liquid sterol preparation through a vibrating perforated disk.

3. The process of claim 2 wherein the vibrating perforated disk contains perforations having a diameter of from about 0.15 to about 1.2 mm.

4. The process of claim 3 wherein the liquid sterol droplets have a diameter of from about 1.55 to about 2.0 times the diameter of the perforations.

5. The process of claim 1 wherein the liquid sterol droplets are solidified into spherically-shaped sterol preparations by cooling the liquid sterol droplets.

6. The process of claim 5 wherein the liquid sterol droplets are cooled using a cooling gaseous or liquid medium.

7. The process of claim 6 wherein the cooling gaseous or liquid medium is selected from the group consisting of air, nitrogen, carbon dioxide, and mixtures thereof.

8. The process of claim 1 wherein the liquid sterol preparation of step (a) has a temperature of from about 110 to about 150° C.

9. The process of claim 2 wherein the perforated disk vibrates in a frequency range of from about 200 to about 2000 Hz.

10. The process of claim 1 wherein the spherically-shaped sterol preparations have a diameter of from about 0.23 to about 2.4 mm.

11. The process of claim 1 wherein the liquid sterol preparation has an active substance content of from about 70 to about 99.9% by weight, based on the weight of the preparation.

12. The product of the process of claim 1.
13. The product of the process of claim 2.
14. The product of the process of claim 3.
15. The product of the process of claim 4.
16. The product of the process of claim 5.
17. The product of the process of claim 6.
18. The product of the process of claim 7.
19. The product of the process of claim 8.
20. The product of the process of claim 9.
21. The product of the process of claim 10.
22. The product of the process of claim 11.

* * * * *